P. HARIVEAU.
KEYING DEVICE FOR SHAFTS.
APPLICATION FILED AUG. 2, 1920.

1,417,826.

Patented May 30, 1922.

Inventor
P. Hariveau,
By H. R. Kerslake.
Attorney

UNITED STATES PATENT OFFICE.

PAUL HARIVEAU, OF PARIS, FRANCE.

KEYING DEVICE FOR SHAFTS.

1,417,826.

Specification of Letters Patent.  Patented May 30, 1922.

Application filed August 2, 1920. Serial No. 400,782.

*To all whom it may concern:*

Be it known that I, PAUL HARIVEAU, citizen of the Republic of France, residing at Paris, France, 21 Rue de la Source, have invented certain new and useful Improvements in Keying Devices for Shafts, of which the following is a specification.

This invention relates to improved means for keying the hub of a wheel to its shaft, particularly suitable for keying the rotors of centrifugal pumps, in which a flexible split ring, forming an abutment, engages at each end of the hub in a slot in the key which secures the hub to the shaft.

Figure 1:
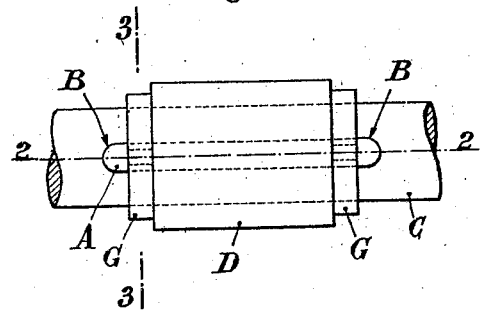
Figure 3:
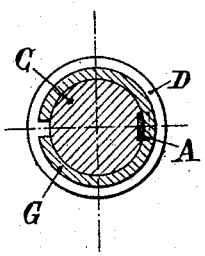
Figure 2:
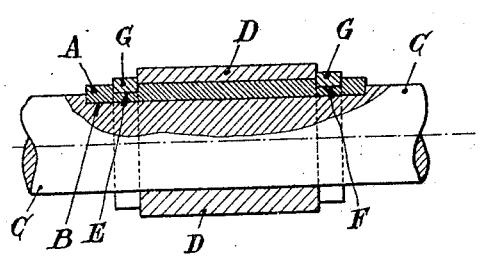
Figure 4:
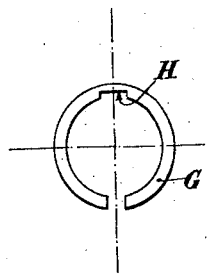

The invention will be described with reference to the accompanying drawing wherein Figure 1 shows the device in plan; Figure 2 is a longitudinal section on the line 2—2 of Fig. 1, and Fig. 3 is a cross section on the line 3—3 of Fig. 1, while Fig. 4 shows a modification.

A is the key, preferably rounded at both ends, which as will be seen, is partially embedded in a keyway B, on the shaft C, in such manner as to connect the hub D securely to the latter. At each end the key is provided with recesses E, F, so positioned that the distance between their inner edges corresponds to the length of the hub. In these recesses engage two split rings G of a thickness sufficient to form abutments for the hub.

The mounting of a hub on a shaft provided with the keying device is effected as follows:

The key A, provided with its two recesses E and F having been inserted in the keyway B of the shaft C, one of the rings G which has been mounted on the shaft is pushed along the shaft until the opening in the ring comes opposite the end of the key, whereupon by simply pressing on the ring, the rounded end of the key causes the ring to expand so as to permit of its being slid along the key as far as the nearest recess, if the two ends of the shaft are free, or up to the furthest recess in the contrary event. When the ring reaches the recess intended for its reception, it engages therein, by virtue of its flexibility, and is thus able to serve as an abutment for the hub. Nevertheless it is preferable to turn the ring through an angle of 180° so as to bring it, for example, into the position shown in Figs. 1, 2, 3. The hub is then slipped on to the shaft, and the second ring is afterwards engaged in the second recess in the same manner.

This keying device, which may be made of any suitable material, enables fixed stops, shoulders, threaded portions, etc., to be dispensed with more particularly in centrifugal pumps; and it also enables the hub to be mounted very accurately in the desired position. Moreover it has the advantage of serving as an abutment or stop for both sides of the hub without either the shaft or the hub having to be modified, and can be easily put into position or removed without damaging the shaft. It, therefore, enables shafts to be used that will not stand much knocking about, saves raw material, and is capable of application wherever the prevention of the longitudinal displacement of one member in relation to another is in question; pulleys, sleeves, gearing, rotors of centrifugal pumps, turbines, fans, etc.

Numerous modifications in matters of detail may be introduced into the device without departing from the principle of the invention. For example, in place of a single key, several keys may be arranged in keyways provided in the shaft, if the effort to be overcome is considerable. Furthermore, the key or keys may be provided with only a single recess, and therefore receive only one ring, in cases where the longitudinal thrust is continually exerted in only one and the same direction, as is the case in centrifugal pumps, turbines and fans with rotors having only one intake.

It may be mentioned that the distance between the two ends of the ring when in position on the shaft is preferably rather less than the width of the key, so that, if it should be turned by the rotation of the hub it would not be forced off the key. Moreover, such movement, if occurring, could be easily prevented, as all that is necessary is to provide a recess H inside the ring as shown in Fig. 4, and to make the recess in the key shallower, so as to obtain a firm connection between the key and the ring.

What I claim is:

1. A device for keying the hub of a wheel to its shaft and more especially the rotors of centrifugal pumps, a key connecting the hub to the shaft, a recess provided in the key at each end of the hub and a flexible split ring engaged in said recess forming an abutment for the hub.

2. In a device for keying the hub of a wheel to its shaft, a key connecting the hub to the shaft, a recess provided in the key and a flexible split ring engaged in the recess of the key, said ring being also provided with a recess for engaging the key.

3. In a device of the character described, a shaft key adapted for confinement in the key groove in a shaft, and a resilient shaft embracing ring interlocking with said key forming an abutment for a shaft carried member.

4. In a device of the character described, a key adapted for confinement in the key groove of a shaft, a split shaft embracing ring arranged to maintain the key in position in the key groove, and means interlocking said ring with said key whereby to prevent displacement of the ring longitudinally of the key.

5. In a device of the character described, a key adapted to be confined in the key groove of a shaft, a resilient ring adapted to embrace the key and shaft, and means to lock the ring against movement longitudinally of the shaft whereby said ring may form a rigid abutment for a shaft carried member.

6. In a device of the character described, a key adapted for confinement in the keyway of a shaft, and a split resilient ring adapted to embrace the key and shaft to maintain the key in position, said key having a rounded extremity adapted to enter between the ends of the rings at the split whereby to expand the latter and facilitate its application over the key.

7. In a device of the character described, a key adapted for confinement in the keyway of a shaft, and a shaft embracing ring receiving the key, said key and ring having interfitting portions preventing rotary movement of the ring with respect to the key and longitudinal movement of the key with respect to the ring.

In testimony whereof I affix my signature.

PAUL HARIVEAU.